United States Patent [19]

Sako et al.

[11] 4,137,172
[45] Jan. 30, 1979

[54] ROTATING BIOLOGICAL CONTACTOR

[75] Inventors: Fumio F. Sako, San Jose; Christopher C. Pearson, Woodside, both of Calif.

[73] Assignee: FMC Corporation, Chicago, Ill.

[21] Appl. No.: 825,220

[22] Filed: Aug. 17, 1977

[51] Int. Cl.$^2$ .............................................. C02C 5/10
[52] U.S. Cl. ..................................... 210/150; 261/92
[58] Field of Search .................. 210/150, 151; 261/92

[56] References Cited

U.S. PATENT DOCUMENTS

| | | | |
|---|---|---|---|
| 3,827,559 | 8/1974 | Gass et al. | 210/150 |
| 4,010,102 | 3/1977 | Jarvstrat | 261/92 X |

FOREIGN PATENT DOCUMENTS 1324358  7/1973  United Kingdom ..................... 261/92

Primary Examiner—Frank A. Spear, Jr.
Assistant Examiner—Richard W. Burks
Attorney, Agent, or Firm—Dressler, Goldsmith, Clement, Gordon & Shore, Ltd.

[57] ABSTRACT

Apparatus for treating sewage by providing a plurality of uniquely designed thin discs that are mounted on a shaft so that the discs are immersed approximately 40% in a sewage tank. The shaft is rotated at peripheral speeds on the order of 35-75 feet per minute to alternately expose the discs to the atmosphere and the liquid containing wastewater in the tank to treat the wastewater in the tank by providing for the growth of biological slimes on the surfaces of the discs. The discs have a corrugated configuration with the corrugations of the alternate discs disposed at ninety degrees to each other to provide maximum usable surface area in a given rotating volume while having sufficient clearance to permit unobstructive sloughing of growths.

4 Claims, 8 Drawing Figures

ROTATING BIOLOGICAL CONTACTOR

BACKGROUND OF THE INVENTION

For many years, in the United States and Europe, one way of treating sewage has been to provide a plurality of rotating discs partly submerged in the wastewater, which discs are located on a shaft and are spaced apart a sufficient amount to permit biological growth on the discs, yet will permit sloughing of the growths. The discs which have been generally flat or slightly raised have been limited in diameter due to shipping limitations. The work that has been done in this area is directed towards treating wastewater, and it is known that using partially submerged rotating discs or drums there is provided a very suitable surface for the growth of biological slimes by exposing them alternately to the atmosphere to gain the oxygen necesary for their respiration and then immersing them in the wastewater for the bioextraction of pollutants for their nutrition. While this concept has been known for many years, it has not been particularly successful, since it has not been possible to get the degree of treatment necesary to economically justify the expense of such apparatus. It is acknowledged that even though rotating biological contactors have been used for many years, new interest is being shown in them, as evidenced by a large number of U.S. Pat. Nos. issued to such companies as Autotrol Corporation of Milwaukee, Wisconsin (Torpey 3,915,854, Antonie 3,704,783, Torpey 3,776,841, Prosser 3,886,074, and numerous others) Environmental Pollution Control Co., Inc. (Joost 3,630,366) and various other U.S. and foreign companies. The resurgence of activity is believed to result from the existence of new plastics and the high energy costs of other systems being currently employed.

In the normal rotating biological contactor system, neither the water, nor the air is moved artificially. Only the biomass growing on the discs is exposed intermittently to the air and the water. The energy required by the emerging portion of the biological growth is compensated for the portion submerging at the same time. The actual amount of power required is used to overcome friction losses of the disc system and to compensate for weight differences between emerging and submerging disc sections. The energy consumption of this process is lower than for many other methods.

It is a primary purpose of the present invention to provide an apparatus that will overcome some of the disadvantages of prior constructions so as to make it more economically and mechanically feasible. It is believed that the present invention will provide apparatus for upgrading existing primary or secondary wastewater treatment plants to remove a substantial fraction, if not virtually all of the carbonaceous BOD being discharged in the effluent. Essentially, it is an object of this invention to provide apparatus that will be more economicaly feasible and reach wide-scale acceptance due to the advantages and efficiencies it offers to treatment plants. The novel apparatus is especially applicable to the nitrification stage that is being added to new plants.

SUMMARY OF THE INVENTION

The novel invention provides an arrangement of novel unique thin-disc surfaces which create a strong, hydraulically desirable, aerobic system for biologically treating wastewater. Essentially, the design consists of discs having a corrugated construction which provides a maximum usable surface in a given rotating area while providing sufficient clearances to permit unobstructive sloughing of the growths on the rotating discs. The corrugations of the adjacent discs are angularly disposed relative to each other which combined with the novel design of the discs requires minimum power for rotating the shaft on which the discs are mounted.

Essentially, the discs are constructed of sheets having a corrugated configuration, which sheets are made out of chemically resistant thermoforming plastic, such as, high density polyethylene that is both relatively inexpensive and inert. With the use of such a material the construction of shafts in the order of 25 feet or longer in length is possible without any great difficulties in construction. The corrugated sheets are stacked alternately, with the corrugations running 90° to each other, and the adjacent corrugated sheets are "hot-needle" welded at various contact points. With "hot-needle" welding, the weld members come down from the top and it is not necessary to support the member to which it has been welded on the other side thereof. There are numerous advantages to this design in addition to those set forth above, including among others that the stacks of sheets are very strong in bending. Additionally, the channels formed by the corrugations for the passage of air and liquid essential to its operation are put into the sheet during extrusion, or immediately after extrusion, in forming rolls, which permit the sheets to be made very thin. By utilizing the extrusion process and/or forming rolls, there is no heat-forming, such as vacuum-forming, or other processes employed that would tend to reduce the strength of the sheet material.

As will be discussed in greater detail hereinafter when dealing with the specific features of the discs, it will be appreciated that they can be easily assembled in the field, thus making it possible to have a size far in excess of that currently available due to shipping and other limitations.

To facilitate an understanding of the present invention, it is important to understand the method of operation of apparatus incorporating the present invention. Specifically, the novel apparatus provides for the growth of biological slimes on the surface of the rotating discs by alternately immersing them in the wastewater for the bioextraction of nutrients and exposing them to the atmosphere for the adsorption of oxygen. As the microorganisms and the slime grow, the thickness of the slime increases to the point where microorganisms adjacent to the disc surface become deprived of fresh nutrients and of oxygen. When this happens, the anaerobic conditions ensue, gas is generated, and the slime sloughs off, or is separated from the disc. Put another way, the alternate immersion and exposure of air enhances the growth of the so-caled biomass, a mass of microorganisms that literally consume organic waste materials and convert them into harmless substances.

Each disc on a rotating shaft contains an attached amount of active biomass to react with the surrounding wastewater. The greater the wastewater flow or concentration of the waste materials the greater the number of discs are required to produce the same degree of treatment. Conversely, the greater degree of treatment required, the greater number of discs are required for the same quantity of wastewater.

If desired, the slime thickness can be controlled by rotating the discs periodically for a short time at an increased velocity to remove excessive growths.

In order to insure that proper contact is made between the slimes and the wastewater and between the slimes and the atmosphere, the disc should be rotated at a peripheral speed in the neighborhood of 35 to 75 feet per second.

The novel and unique design of the apparatus will be understood from the following description of the various parts illustrated in the accompanying drawings, in which.

Figure 1:
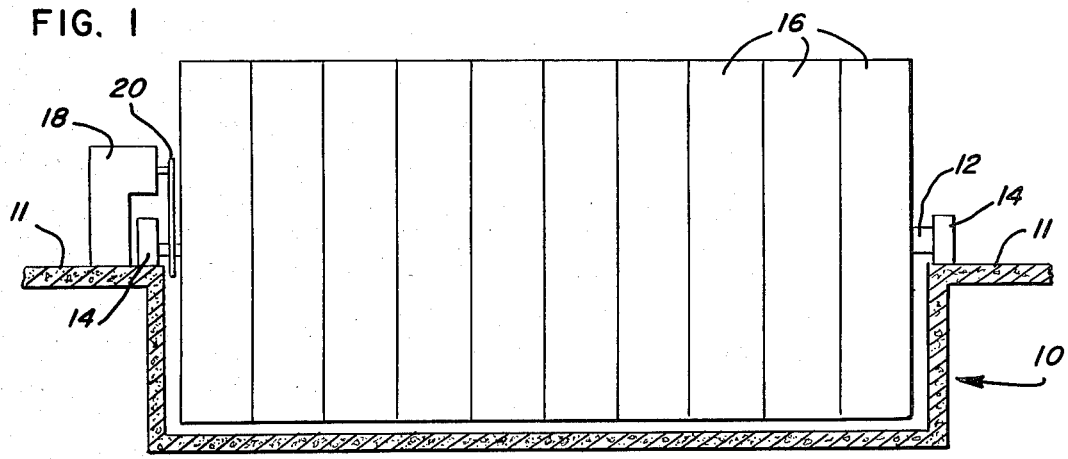
FIG. 1 is a cross-sectional view showing a plurality of modules of biological contactors located in the tank.

Referring first to FIG. 1, there is illustrated a waste treatment tank 10 into which wastewater is introduced and treater water is withdrawn through ports, not shown. Extending across the tank is a shaft 12 mounted in bearings 14 supported on a platform or extension of the upper wall 11 of the tak 10. Located on the shaft in axially spaced relationship are a plurality of modules of discs indicated by the numeral 16, As previously mentioned, the rotating discs treat the wastewater by providing for the growth of biological slimes on the surface of the disc by alternately exposing the discs to atmosphere and the liquid containing sewage in the tank 10.

The shaft 12 and associated disc modules are rotated by motor 18 mounted on wall 11 and shown schematically disposed adjacent the left-hand bearing 14 through a speed reduction system and a chain drive 20 which rotates the shaft 12 to alternately immerse and withdraw the biological contactor discs from the wastewater located in the tank. The flow of wastewater through the tank may be parallel to the discs or normal thereto, as desired.

The disc configuration is designed so that it can treat the wastewater located in the tank in a highly economical and efficient manner. The greater the wastewater flow or concentration of waste materials the greater the surface area of the discs required to accomplish the same degree of treatment. conversely, the greater degree of treatment required, the greater surface area of discs is required for the same quantity or quality of wastewater. Accordingly, for any desired condition, it is necessary that there be provided sufficient surface area on which the biological slimes are located that are alternately exposed to the wastewater and to the atmosphere and oxygen.

The cross-sectional area in the tank is related to the configuration of the discs as well as the spacing of the discs on the shaft. In typical contacting arrangements, the discs are of a generally flat, smooth surface and thereby provide a minimum contact area for a given diameter disc.

In accordance with the present invention, there is provided a novel and unique disc configuration which provides a surface area greater than currently available, while still using the same general type of material currently being used to form the discs. Thus, without requiring any additional weight, increased efficiency of material usage can be obtained which provides many cost advantages. The discs are constructed of a thin, something on the order of 0.030 inch, polyethylene sheet plastic material.

Figure 2:
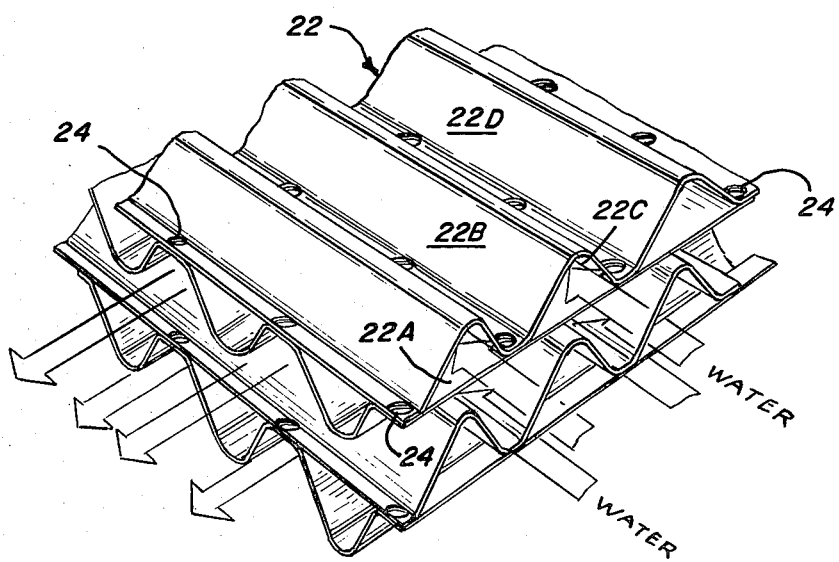
FIG. 2 is a perspective view showing a plurality of discs secured to each other.

The discs 22 of rhe modules 16 have a corrugated configuration as shown in perspective in FIG. 2. This corrugated configuration is obtained through an extrusion process, or by employing an initial extrusion step and final forming by means of a subsequent forming process. In either event, the disc has a uniform thickness and thus a uniform structural rigidity. The corrugation is unique in that the discs 22 form a plurality of straight-through channels 22A, 22B, 22C, etc., which can drain and fill easily and can readily be cleaned due to the clear unencumbered design such passages provide. A typical corrugated channel configuration is one that has a flat portion having a width of about ½ inch and sides diverging over a distance of ½ inch to a flat portion having approximately a ½ inch width. Thus, the center of one corrugation to the center of an adjacent one is on the order of 2 inches. This corrugated design is by way of example only since other designs could be employed if desired. In the embodiment illustrated in FIG. 2, the adjacent corrugated discs are disposed at 90° to each other, which results in a plurality of contact points 24 where they are "hot-needled" together to form a rigid module. The corrugated, or channel construction 22A, 22B, etc., of the discs 22 provides, in addition to the structural rigidity aforementioned and substantially increased surface area, a design whereby the discs can be readily cleaned. In addition, this construction provides for more complete oxygen transfer into the inner shaft area.

Figure 3:
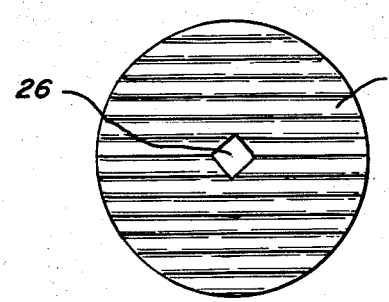
FIG. 3 is an elevational view of a single disc.
Figure 4:
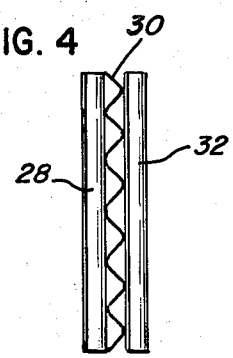
FIG. 4 is a view showing a plurality of discs mounted at 90° relative to each other.

In FIG. 3, there is illustrated a single assembled corrugated disc 22 shown provided with a square center opening 26 for the shaft 12. In FIG. 4, there is shown a series of three interconnected discs 28, 30, 32.

Figure 5:
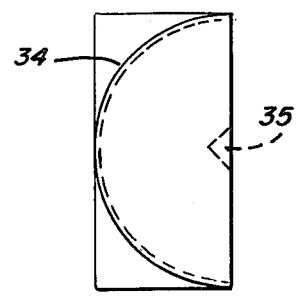
FIG. 5 illustrates half a disc segment before it is cut to the desired configuration.

The discs are manufactured individually by extruding the polyethylene material in the form of a corrugated rectangular section on the order, for example, of 6 feet wide and 12 feet long. This design is by way of example only, since it is equally aplicable to other sizes as well. These individual sections can be conveniently stacked in a nested form and moved to the site where they are to be cut to the desired configuration and assembled into modules for mounting on a shaft to be disposed in a tank. The nested units in the form shown in FIG. 5 are trimmed as indicated along the score line 34 to form a semi-cylindrical configuration. The discs are welded to each other and then they are subsequently secured to the shaft 12. It can be appreciated that the unused or cut away material can be recycled. The adjacent individual layers disposed at 90° to each other when welded together interconnect the discs to each other to make a unitary structure.

In the manufacturing process, the sheets are further cut away at a center location, as indicated at 35, to facilitate the mounting of the semi-circular sections on the drive shaft 12.

Figure 8:
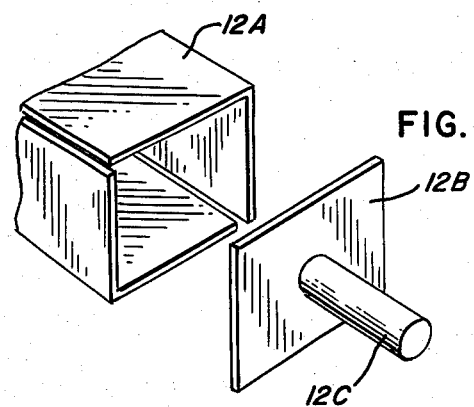
FIG. 8 is an exploded view showing a shaft configuration.

Turning to FIG. 8, a drive shaft of the type to be used consists of, for example, a 16-inch box section 12A and end plates 12B to which is secured a stub shaft 12C.

Figure 7:
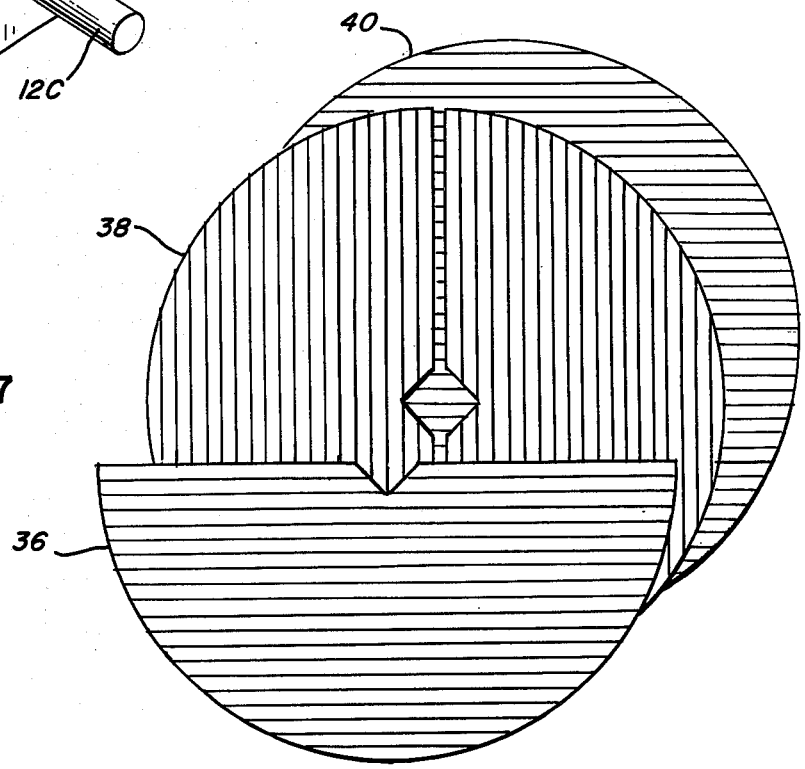
FIG. 7 is an intermediate assembly stage showing discs prior to being assembled on the shaft.

FIG. 7 illustrates in an exploded fashion an assembly process that can be employed on the job site. In this figure, the orientation of the discs is schematically illustrated.

Figure 6:
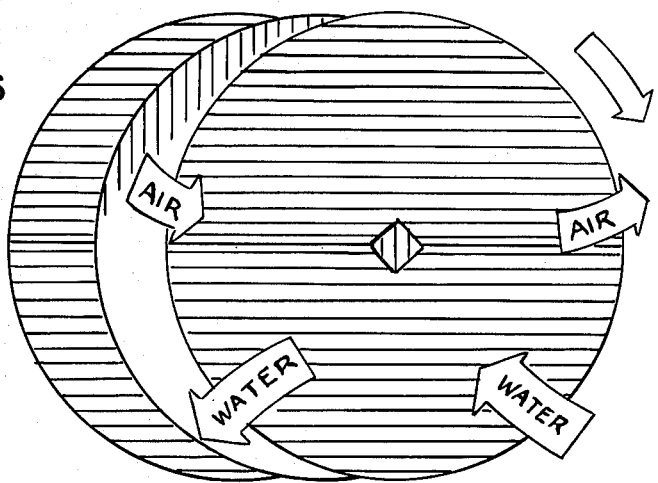
FIG. 6 is an exploded perspective view showing a plurality of discs and the interaction of air and water relative thereto.

The novel construction of the individual discs and the orientation of the adjacent discs provide for draining the discs rapidly of water as they emerge from the wastewater in the tank and also for the rapid release of the air located in the channels at the opposite end as the modular unit dips into the tank. A flow pattern of the type that takes place is schematically illustrated in FIG. 6.

While it is illustrated and described that the adjacent discs are disposed at 90° relative to each other, this orientation could be 45°, or 60°, or some other angle, and still could incorporate the essence of the present invention.

The aforementioned draining of the water and rapid introduction of air reduces the pumping action and thus minimizes the load on the motor to obtain the desired rpm. of the discs in the tank to effect the desired treatment. Furthermore, the direct-through channel configuration eliminates potential clogging of the discs because it eliminates dead ends and other barriers which would tend to block the soughing off of the slimes from the discs as they are being rotated. Furthermore, and of particular importance, is that with this novel construction the discs can be readily cleaned by jets of water or mechanical cleaning devices of various types.

The above is in contrast to those currently existing rotating biological contactors which employ discs that are corrugated or embossed in any way and require several changes of direction for any water that is carried forward or upward by the discs. This difficulty in draining the water trapped between the various discs requires additional pumping action and therefore an additional energy source. Here again, in other existing units the configurations thereof make it extremely difficult to clean, which obviously results in substantial periodic downtime.

As aforementioned, the surface area of the discs alternately exposed to the wastewater and the atmosphere in the tank determines the degree of treatment of the wastewater. Thus, if a greater surface area could be obtained within a specified axial distance, there would be fewer discs required than is the case with existing contactor discs, or a greater degree of treatment would be obtained with the same number of discs.

In constrast to biological contactors currently on the market, it has been found that the novel channel configuration of the present invention provides for approximately one third more surface area when the discs are positioned at a spacing equivalent to that found in the existing units. If the same spacing is maintained, then, of course, there will be greater available surface area. Alternately, if it is desired to have the same surface area, and the disc spacing is similar to existing units, then fewer discs are needed.

Generally speaking, the present invention provides for 10% to 50% greater surface area than existing competitive units having the same axial length. Furthermore, with our novel design, less plastic material is required to obtain equivalent surface area with the result that there is a lower material cost. Illustrative of this is that with the corrugated configuration thinner material can be used without sacrificing strength. Put another way, with the novel construction herein described and illustrated, there is greater media surface area and greater material utilization than existing units of the type referred to in the representative patents set forth at the beginning of this specification.

A typical full-scale, single-stage rotating biological contactor unit consists of ten disc modules mounted on a 16-inch square steel shaft. This unit would be about 12 feet in diameter and 25 feet long and have about 100,000 square feet of active surface. It is installed in a shaped tank at approximatey 40% immersion and is rotated at about 1.5 rpm. Biological growths form on the surfaces and do the actual treatment of the wastewater. Periodically, the growths slough off patches and are removed from the effluent by conventional clarifiers.

As previously mentioned, typical constructions are discs having approximately 12 feet in diameter. This has been determined as a limitation, because the maximum width of truck haulers is about 12 feet. However, as previously mentioned, the present construction tends itself to module designs that can be constructed on site. Three 6-foot sections could be put together at a site and therefore an assembled disc having a diameter of 18 feet is possible. the 18-foot diameter is merely by way of example, since obviously other diameters could be employed if desired and as determined by various other factors which form no part of the present invention. Also, if desired, induced air can be employed by a blower or other equipment in order to improve the oxygen exchange through the disc channels.

It is, of course, intended to cover by the appended claims all such modifications that fall within the true spirit and scope of the invention.

What is claimed is:

1. Apparatus for treating sewage, or the like, including a tank containing liquid to be treated, shaft means in said tank extending through each of a plurality of axially disposed interconnected generally cylindrical channel-shaped corrugated discs for supporting same, means for securing said discs together in abutting relationship, means for rotating the shaft means to rotate said discs to alternately immerse the discs into the the liquid to be treated and expose bacterial growths disposed thereon to atmosphere, said channel-shaped corrugations being disposed in a parallel chordal relationship and said channel-shaped corrugations extending completely across the discs and having opposite open ends at the periphery of said discs, the adjacent discs being angularly disposed relative to each other to minimize the power required to drive said shaft means.

2. Apparatus as set forth in claim 1 in which the adjacnet discs are interconnected by needle-welding them together at a plurality of portions of the adjacent discs that are in direct contact with each other and the adjacent channels in the corrugated discs are disposed at 90° relative to each other so that as the discs are rotated, the discs are draining liquid to minimize the power requirements to drive the rotor through the liquid.

3. Apparatus as set forth in claim 2 in which the discs are made of thin extruded polyethylene and are immersed in the tank to approximately 40% of the disc diameter.

4. Apparatus as set forth in claim 1 in which the adjacent channel sections of the corrugated discs are substantially identical but inversely disposed relative to each other, the channel sections being defined by a relatively narrow flat section and diverging sidewalls.

* * * * *